United States Patent
Westphal et al.

(10) Patent No.: US 9,142,067 B2
(45) Date of Patent: Sep. 22, 2015

(54) SYSTEM AND METHOD FOR AXLE MEASUREMENT OF A MOTOR VEHICLE

(71) Applicant: ROBERT BOSCH GMBH, Stuttgart (DE)

(72) Inventors: Stephen Westphal, Munich (DE); Klaus Hummel, Kirchheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/352,799

(22) PCT Filed: Sep. 27, 2012

(86) PCT No.: PCT/EP2012/069024
§ 371 (c)(1),
(2) Date: Apr. 18, 2014

(87) PCT Pub. No.: WO2013/056962
PCT Pub. Date: Apr. 25, 2013

(65) Prior Publication Data
US 2014/0379203 A1 Dec. 25, 2014

(30) Foreign Application Priority Data
Oct. 20, 2011 (DE) .......................... 10 2011 084 876

(51) Int. Cl.
*G01B 21/24* (2006.01)
*G01M 17/007* (2006.01)
*G07C 5/08* (2006.01)
*G01B 21/26* (2006.01)
(Continued)

(52) U.S. Cl.
CPC ................ *G07C 5/08* (2013.01); *B60W 10/16* (2013.01); *B60W 10/184* (2013.01); *G01B 21/26* (2013.01); *G01B 2210/26* (2013.01)

(58) Field of Classification Search
CPC ...... B60W 10/184; B60W 10/16; G07C 5/08; G01B 21/26; G01B 2210/26; G01B 5/255; G01B 11/275; G01B 7/315
See application file for complete search history.

(56) References Cited

U.S. PATENT DOCUMENTS 5,335,420 A * 8/1994 Kling et al. ..................... 33/288
6,139,117 A * 10/2000 Shirai et al. ..................... 303/3
6,327,548 B1 * 12/2001 Healy ............................ 702/151
(Continued)

FOREIGN PATENT DOCUMENTS

DE      20105929      8/2001
DE      10236620      2/2004
(Continued)

OTHER PUBLICATIONS

International Search Report for PCT/EP2012/069024, issued on Mar. 25, 2013.

*Primary Examiner* — Michael J Zanelli
(74) *Attorney, Agent, or Firm* — Kenyon & Kenyon LLP

(57) ABSTRACT

A method for axle measurement of a motor vehicle, including the steps of initiating a first axle measurement operation, using a first selection signal; outputting a first control signal to an electronic brake control system of the motor vehicle as a function of the first selection signal; activating a first brake configuration of electronically operable brakes of the motor vehicle as a function of the first control signal, using the electronic brake control system; and carrying out the first axle measurement operation while the first brake configuration is activated.

9 Claims, 1 Drawing Sheet

(51) Int. Cl.
*B60W 10/16* (2012.01)
*B60W 10/184* (2012.01)

(56) References Cited

U.S. PATENT DOCUMENTS 7,328,124 B2 * 2/2008 Voeller .......................... 702/151

7,359,775 B2 * 4/2008 Strege et al. ................. 701/31.4

FOREIGN PATENT DOCUMENTS

| DE | 102004001439 | 3/2005 |
| DE | 102009009887 | 8/2010 |
| EP | 1672348 | 6/2006 |
| EP | 2246686 | 11/2010 |

* cited by examiner

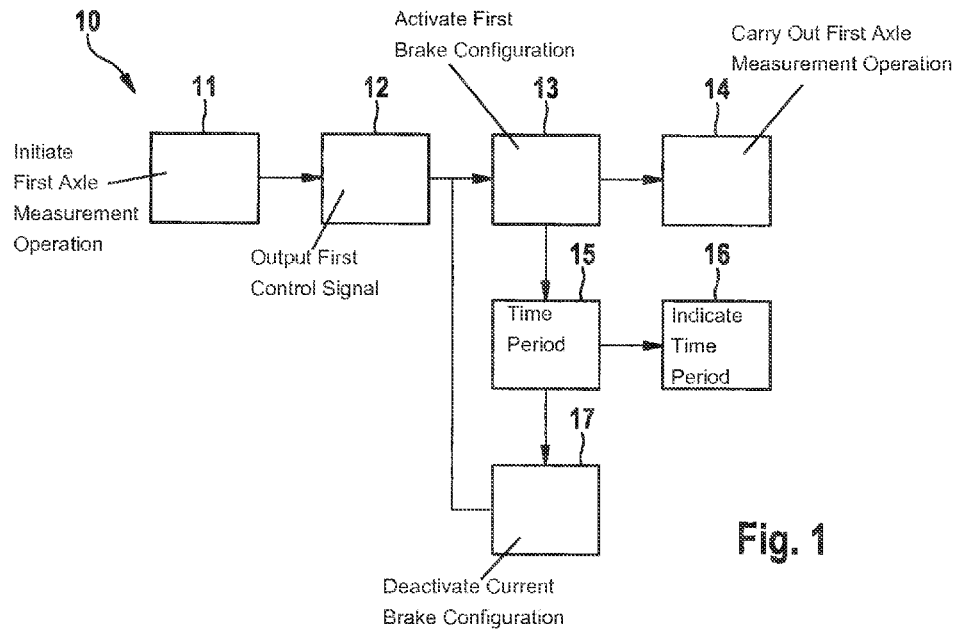
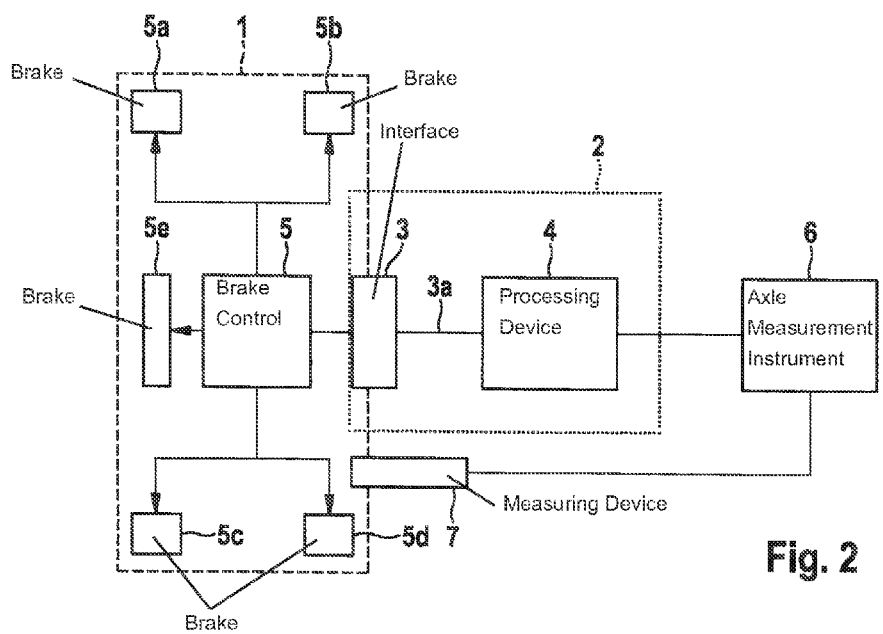

SYSTEM AND METHOD FOR AXLE MEASUREMENT OF A MOTOR VEHICLE

FIELD OF THE INVENTION

The present invention relates to a system and method for axle measurement of a motor vehicle, in particular, a motor vehicle having electronic brake control.

BACKGROUND INFORMATION

For axle measurement and/or steering angle calibration of motor vehicles on an axle test bench, it is necessary to lock up the brakes of the motor vehicle, in order to prevent it from rolling away and to be able to execute the measuring and testing procedures correctly. Locking the brakes, that is, protecting the motor vehicle from rolling motions of individual wheels or all wheels, may be carried out manually, for example, by holding the brake pedal of the motor vehicle in an activated position, using a pedal clamp.

German Published Patent Appln. No. 201 05 929 describes a chassis test bench for motor vehicles, having wheel holding fixtures, in which the wheels of the motor vehicle may be positioned and protected from rolling away.

German Published Patent Appln. No. 10 2004 001 439 describes a test bench for motor vehicles, in which a rolling surface of a wheel rolling device may be locked or fixed in position, in order to be able to carry out an axle measurement during a rotation of the wheel rolling device.

Thus, there is a need for systems and methods of axle measurement in motor vehicles, which may be implemented more simply, rapidly and reliably.

SUMMARY

According to one aspect, the present invention provides a method for axle measurement of a motor vehicle, including the steps of initiating a first axle measurement operation, using a first selection signal; outputting a first control signal to an electronic brake control system of the motor vehicle as a function of the first selection signal; activating a first brake configuration of electronically operable brakes of the motor vehicle as a function of the first control signal, using the electronic brake control system; and carrying out the first axle measurement operation while the first brake configuration is activated.

According to a further aspect, the present invention provides a computer program product, which includes machine-readable instructions that are designed to execute a method of the present invention on a computer.

According to a further aspect, the present invention provides a system for supporting the axle measurement of a motor vehicle, including an interface, which may be coupled to an electronic brake control system of the motor vehicle, and which is configured to transmit control signals for activating brake configurations of electronically operable brakes of the motor vehicle to the electronic brake control system; and including a digital signal processing device, which is coupled to the interface, and which is configured to receive a selection signal for initiating an axle measurement operation and to transmit a control signal to the electronic brake control system via the interface as a function of the selection signal; the control signal indicating an activation of a brake configuration of electronically operable brakes of the motor vehicle by the electronic brake control system.

According to a further aspect, the present invention provides an axle test bench for a motor vehicle, including a system of the present invention.

One idea of the present invention is to call up functions of electronic brake control systems of the motor vehicle while carrying out an axle measurement, in order to automatically lock the brakes of the motor vehicle during the measurement. The preparation time for the axle measurement and/or steering-angle sensor calibration is reduced considerably by the program-controlled, automatic locking of the brakes, since manual locking of the brakes is no longer necessary.

According to one specific embodiment, the method may further include the steps of initiating a second axle measurement operation, using a second selection signal; outputting a second control signal to the electronic brake control system of the motor vehicle as a function of the second selection signal; changing over the first brake configuration to a second brake configuration different from the first brake configuration as a function of the second control signal, using the electronic brake control system; and carrying out the second axle measurement operation while the second brake configuration is activated. Consequently, different axle measurements may be advantageously carried out in succession, which have different requirements regarding the mobility of the individual wheels of the motor vehicle.

According to a further specific embodiment, the first and/or second brake configuration may each include locking the brakes of the front wheels of the motor vehicle, locking the brakes of the rear wheels of the motor vehicle, and alternately locking the brakes of, in each instance, a front wheel and a diagonally opposite rear wheel of the motor vehicle. Therefore, first of all, the motor vehicle may be prevented from rolling away in an unwanted manner, and secondly, special axle measurement procedures such as a steering lock routine may be carried out.

According to a further specific embodiment, the electronically operable brakes may include wheel brakes and/or an electromechanical parking brake. In this manner, different brake configurations may be implemented, which may be flexibly adapted to the respective axle measurement situation.

According to a further specific embodiment, the method may also include the steps of measuring the period of time after activation of a current brake configuration, while the current brake configuration is active; outputting the current period of time to a user, who carries out the axle measurement at the motor vehicle; and automatically deactivating the current brake configuration when a predetermined period of time is exceeded. This allows an overload of the electronic brakes to be prevented, for example, when the front wheels are permanently locked.

According to a further specific embodiment, the first and/or second axle measurement operation may include a toe measurement, a camber measurement, a wheel offset measurement, a caster measurement, a steering axis inclination measurement, a relative steering angle measurement, an axle angle measurement, a wheelbase difference measurement, an axle offset measurement, a steering-angle sensor calibration and/or a track-width difference measurement. This has the advantage that complete acquisition of setpoint values of the axle measurement is possible with the aid of the electronic brake control system.

According to a further specific embodiment, the electronic brake control system is an electronic stability control system of the motor vehicle. In particular, motor vehicles having electronic stability control may be advantageously measured, using the method, since their wheel brakes may be deliberately and selectively controlled via external control signals.

Further features and advantages of specific embodiments of the present invention are derived from the following description, with reference to the attached figures.

BRIEF DESCRIPTION OF THE DRAWINGS

FIG. 1 shows a schematic representation of a method for axle measurement of a motor vehicle according to a specific embodiment of the present invention; and FIG. 2 shows a schematic representation of an axle test bench for axle measurement of a motor vehicle according to a further specific embodiment of the present invention.

DETAILED DESCRIPTION

FIG. 1 shows a schematic representation of a method 10 for axle measurement of a motor vehicle. In this context, in the spirit of the present invention, motor vehicles may include, in particular, land vehicles having one or more axles; two or more wheels being mounted on each of the axles. In this context, motor vehicles may include, e.g., passenger cars, trucks or other automobiles.

Method 10 for axle measurement of a motor vehicle may be used, in this context, for a multitude of axle measurement operations, such as a toe measurement, a camber measurement, a wheel offset measurement, a caster measurement, a steering-axis inclination measurement, a relative steering angle measurement, an axle angle measurement, a wheelbase difference measurement, an axle offset measurement, a steering-angle sensor calibration, a track-width difference measurement, or other axle measurement operations. After an axle measurement has been taken, then, for example, a steering-angle sensor calibration of the motor vehicle may be carried out. Method 10 is explained below in light of the exemplary configuration of an axle test bench, which is schematically illustrated in FIG. 2.

In a first step 11, method 10 includes initiating a first axle measurement operation, using a first selection signal. To that end, a user, for example, a mechanic or a garage attendant, may make, on an operator interface of a digital signal processing device 4 of an axle test bench, a selection of an axle measurement operation to be carried out, for example, by selecting a menu item in corresponding axle measurement software, which may be installed on digital signal processing device 4. In a second step 12, a first control signal may then be outputted to an electronic brake control system 5 of a motor vehicle 1 as a function of the first selection signal. The first selection signal may be transmitted, for example, via an interface 3, which may be connected to motor vehicle 1 and may be coupled to electronic brake control system 5. Interface 3 may be configured to transmit control signals for activating brake configurations of electronically operable brakes 5a, 5b, 5c, 5d, 5e of motor vehicle 1 to electronic brake control system 5.

Electronic brake control system 5 may include, for example, an electronic stability program, an electronic stability control system, or another system, by which electronically operable brakes 5a, 5b, 5c, 5d, 5e of motor vehicle 1 may be controlled in a selective and externally controllable manner. Electronically operable brakes 5a, 5b, 5c, 5d, 5e of motor vehicle 1 may include, for example, wheel brakes 5a, 5b, 5c, 5d for individual wheels of motor vehicle 1 and an electromechanical parking brake or hand brake 5e. The number of electronically operable brakes 5a, 5b, 5c, 5d, 5e of motor vehicle 1 is shown to be five, for example, but it should be clear that any other number of electronically operable brakes is possible, as well.

In this context, electronic brake control system 5 may be configured to set different brake configurations, by activating different combinations of electronically operable brakes 5a, 5b, 5c, 5d, 5e. For example, the brake configurations may include, in each instance, locking the brakes of the front wheels by operating front wheel brakes 5a, 5b of the motor vehicle, locking the brakes of the rear wheels by operating rear wheel brakes 5c, 5d of the motor vehicle, and alternately locking the brakes of, in each instance, a front wheel and a diagonally opposite rear wheel of the motor vehicle by operating respectively assigned brakes 5a, 5b, 5c, 5d. For example, alternately locking the brakes of, in each instance, a front wheel and a diagonally opposite rear wheel may be achieved by activating one of the two front wheel brakes 5a, 5b and one of the two rear wheel brakes 5c, 5d simultaneously for a predetermined time span. In this context, the predetermined time span may be selected so that overloading of the individual wheel brakes is prevented. After expiration of the predetermined time span, the respective, non-activated front wheel brakes and rear wheel brakes may be activated, and the activated brakes may be released. This may be done alternatingly, so that motor vehicle 1 is always protected from rolling away in an unwanted manner, but overloading of brake 5a, 5b, 5c, 5d is simultaneously prevented.

In a step 13, a first brake configuration of electronically operable brakes 5a, 5b, 5c, 5d, 5e of motor vehicle 1 may be activated by electronic brake control system 5 as a function of the first control signal. In a step 14, the first axle measurement operation may then be carried out while the first brake configuration is activated. In this context, the axle measurement may be carried out by an axle measurement instrument 6, which may be connected to further measuring devices 7, such as cameras, sensors or similar devices. In this context, measuring devices 7 are used for acquiring the relevant setpoint values of the respectively executed axle measurement operation.

In this instance, method 10 may optionally be repeated after an executed, first axle measurement operation, in that a second axle measurement operation is initiated by a second selection signal, a second control signal is outputted to electronic brake control system 5 of motor vehicle 1 as a function of the second selection signal, and the first brake configuration is changed over by electronic brake control system 5 to a second brake configuration different from the first brake configuration, as a function of the second control signal. Subsequently, the second axle measurement operation may be carried out while the second brake configuration is activated.

Optionally, the method may further include the step 15 of measuring the period of time after activation of a current brake configuration, while the current brake configuration is active. In a step 16, the measured period of time may be indicated to a user who takes the axle measurement at the motor vehicle, for example, a mechanic or a garage attendant. In this manner, the user knows how much time remains for him or her to carry out the current axle measurement operation. If a predetermined period of time is exceeded, then, in a step 17, the current brake configuration is automatically deactivated. This may be the case, for example, when the two front wheel brakes 5a, 5b are activated and alternating activation of brakes is not possible. Then, using steps 15, 16 and 17, it is possible to prevent overloading of the brakes by maintaining the selected brake configuration for only a maximum time span and subsequently releasing the brakes. Simultaneously locking the two front wheel brakes 5a, 5b may be necessary, for example, when performing a steering lock routine, or when taking a directional stability measurement.

Method 10 may be present in machine-readable form, that is, a computer program product, which includes machine-readable instructions that are designed to execute method 10 on a computer, for example, digital signal processing device 4.

FIG. 2 shows the schematic representation of a system 2 for supporting the axle measurement of a motor vehicle 1. In this context, system 2 may be configured, in particular, to execute a method of axle measurement of a motor vehicle, for example, method 10 in FIG. 1. System 2 includes an interface 3, which may be coupled to an electronic brake control system 5 of motor vehicle 1, and which is configured to transmit control signals for activating brake configurations of electronically operable brakes 5a, 5b, 5c, 5d, 5e of motor vehicle 1 to electronic brake control system 5. Interface 3 may be coupled to a digital signal processing device 4 via a data connection 3a. Data connection 3a may include, for example, a wired LAN connection or a wireless communications link, such as an infrared connection, a Bluetooth connection, a radio communications link, or a WLAN connection. Digital signal processing device 4 may include, for example, a PC, a laptop, a smart phone, a cellular phone, a garage server, or another computer. Digital signal processing device 4 may be, for example, a computing device that is integrated into the axle test bench. Different programs, such as software of the axle test bench, control software for control diagnostic units, or similar software may be installed on digital signal processing device 4. Digital signal processing device 4 may be configured to receive selection signals for initiating axle measurement operations.

What is claimed is:

1. A method for axle measurement of a motor vehicle, comprising:
    initiating a first axle measurement operation, using a first selection signal;
    outputting a first control signal to an electronic brake control system of the motor vehicle as a function of the first selection signal;
    activating a first brake configuration of electronically operable brakes of the motor vehicle as a function of the first control signal, using the electronic brake control system;
    carrying out the first axle measurement operation while the first brake configuration is activated;
    initiating a second axle measurement operation, using a second selection signal;
    outputting a second control signal to the electronic brake control system of the motor vehicle as a function of the second selection signal;
    changing over the first brake configuration to a second brake configuration different from the first brake configuration as a function of the second control signal, using the electronic brake control system; and
    carrying out the second axle measurement operation while the second brake configuration is activated.

2. The method as recited in claim 1, wherein at least one of the first brake configuration and the second brake configuration each includes locking brakes of front wheels of the motor vehicle, locking brakes of rear wheels of the motor vehicle, and alternately locking the brakes of, in each instance, a front wheel and a diagonally opposite rear wheel of the motor vehicle.

3. The method as recited in claim 1, wherein the electronically operable brakes include at least one of wheel brakes and an electromechanical parking brake.

4. The method as recited in claim 1, wherein at least one of the first axle measurement operation and the second axle measurement operation includes at least one of a toe measurement, a camber measurement, a wheel offset measurement, a caster measurement, a steering axis inclination measurement, a relative steering angle measurement, an axle angle measurement, a wheelbase difference measurement, an axle offset measurement, a steering-angle sensor calibration, and a track-width difference measurement.

5. The method as recited in claim 1, wherein the electronic brake control system is an electronic stability control system of the motor vehicle.

6. A method for axle measurement of a motor vehicle, comprising:
    initiating a first axle measurement operation, using a first selection signal;
    outputting a first control signal to an electronic brake control system of the motor vehicle as a function of the first selection signal;
    activating a first brake configuration of electronically operable brakes of the motor vehicle as a function of the first control signal, using the electronic brake control system;
    carrying out the first axle measurement operation while the first brake configuration is activated;
    initiating a second axle measurement operation, using a second selection signal;
    outputting a second control signal to the electronic brake control system of the motor vehicle as a function of the second selection signal;
    changing over the first brake configuration to a second brake configuration different from the first brake configuration as a function of the second control signal, using the electronic brake control system;
    carrying out the second axle measurement operation while the second brake configuration is activated;
    measuring a period of time after activation of a current brake configuration, while the current brake configuration is active;
    outputting the current period of time to a user, who takes the axle measurement at the motor vehicle; and
    automatically deactivating the current brake configuration, when a predetermined period of time is exceeded.

7. A computer program product which includes machine-readable instructions that are designed to execute on a computer a method for axle measurement of a motor vehicle, comprising:
    initiating a first axle measurement operation, using a first selection signal;
    outputting a first control signal to an electronic brake control system of the motor vehicle as a function of the first selection signal;
    activating a first brake configuration of electronically operable brakes of the motor vehicle as a function of the first control signal, using the electronic brake control system;
    carrying out the first axle measurement operation while the first brake configuration is activated;
    initiating a second axle measurement operation, using a second selection signal;
    outputting a second control signal to the electronic brake control system of the motor vehicle as a function of the second selection signal;
    changing over the first brake configuration to a second brake configuration different from the first brake configuration as a function of the second control signal, using the electronic brake control system; and
    carrying out the second axle measurement operation while the second brake configuration is activated.

8. A system for supporting an axle measurement of a motor vehicle, comprising:

an interface for coupling to an electronic brake control system of the motor vehicle and configured to transmit control signals for activating brake configurations of electronically operable brakes of the motor vehicle to the electronic brake control system; and a digital signal processing device coupled to the interface;

wherein the digital signal processing device is configured to
- receive a first selection signal for initiating a first axle measurement operation,
- transmit a first control signal to the electronic brake control system via the interface as a function of the first selection signal, the first control signal indicating an activation of a first brake configuration of the electronically operable brakes of the motor vehicle by the electronic brake control system,
- carry out the first axle measurement operation while the first brake configuration is activated,
- receive a second selection signal for initiating a second axle measurement operation,
- transmit a second control signal to the electronic brake control system via the interface as a function of the second selection signal, the second control signal indicating a changing over the first brake configuration to a second brake configuration different from the first brake configuration as a function of the second control signal, using the electronic brake control system, and
- carry out the second axle measurement operation while the second brake configuration is activated.

9. An axle test bench for a motor vehicle, comprising:

a system for supporting an axle measurement of a motor vehicle, the system including:

an interface for coupling to an electronic brake control system of the motor vehicle and configured to transmit control signals for activating brake configurations of electronically operable brakes of the motor vehicle to the electronic brake control system, and a digital signal processing device coupled to the interface;

wherein the digital signal processing device is configured to
- receive a first selection signal for initiating a first axle measurement operation,
- transmit a first control signal to the electronic brake control system via the interface as a function of the first selection signal, the first control signal indicating an activation of a first brake configuration of the electronically operable brakes of the motor vehicle by the electronic brake control system,
- carry out the first axle measurement operation while the first brake configuration is activated,
- receive a second selection signal for initiating a second axle measurement operation,
- transmit a second control signal to the electronic brake control system via the interface as a function of the second selection signal, the second control signal indicating a changing over the first brake configuration to a second brake configuration different from the first brake configuration as a function of the second control signal, using the electronic brake control system, and
- carry out the second axle measurement operation while the second brake configuration is activated.

* * * * *